US009422985B2

(12) United States Patent
Borchardt et al.

(10) Patent No.: US 9,422,985 B2
(45) Date of Patent: Aug. 23, 2016

(54) SEALING AND BEARING UNIT FOR AT LEAST TWO SHAFTS ORIENTATED IN PARALLEL WITH ONE ANOTHER AND METHOD FOR SEPARATING A SEALING AND BEARING UNIT FROM AT LEAST TWO SHAFTS ORIENTATED IN PARALLEL WITH ONE ANOTHER

(71) Applicant: NETZSCH Pumpen & Systeme GmbH, Selb (DE)

(72) Inventors: Eudes Borchardt, Pomerode (BR); Klaus Heizinger, Pomerode (BR); Thiago Vicznevski, Jaragua do Sul (BR); Rafael Voltolini, Jaragua do Sul (BR)

(73) Assignee: NETZSCH Pumpen & Systeme GmbH, Selb (DE)

( * ) Notice: Subject to any disclaimer, the term of this patent is extended or adjusted under 35 U.S.C. 154(b) by 0 days.

(21) Appl. No.: 14/517,557

(22) Filed: Oct. 17, 2014

(65) Prior Publication Data

US 2015/0110433 A1    Apr. 23, 2015

(30) Foreign Application Priority Data

Oct. 18, 2013  (DE) .......................... 10 2013 111 494

(51) Int. Cl.
*F16C 35/04* (2006.01)
*F16C 33/72* (2006.01)
*F16C 35/067* (2006.01)
(52) U.S. Cl.
CPC ............. *F16C 35/042* (2013.01); *F16C 33/723* (2013.01); *F16C 35/067* (2013.01); *Y10T 29/49698* (2015.01)

(58) Field of Classification Search
CPC .. F16C 33/7886; F16C 35/042; F16C 33/723; F16C 35/067
See application file for complete search history.

(56) References Cited

U.S. PATENT DOCUMENTS

| 3,790,315 A | * | 2/1974 | Emanuelsson | F04C 29/0007 418/191 |
| 4,712,442 A | * | 12/1987 | Baika | F04C 29/02 184/11.2 |
| 2010/0135606 A1 | * | 6/2010 | Ehlert | F16C 23/08 384/477 |
| 2012/0314986 A1 | * | 12/2012 | Bitzl | F16C 19/54 384/584 |

FOREIGN PATENT DOCUMENTS

DE              69422660 T2      8/2000

* cited by examiner

*Primary Examiner* — Thomas R. Hannon
(74) *Attorney, Agent, or Firm* — Whitmyer IP Group LLC

(57) ABSTRACT

A sealing and bearing unit for at least two shafts orientated in parallel with one another is disclosed. The sealing and bearing unit includes a housing preferably constituted in one piece with at least two openings for the at least two shafts orientated in parallel with one another. There are assigned to each opening at least one bearing for the rotational holding of the respective shaft in the housing and at least one seal interposed between the housing and the respective shaft. Furthermore, there is assigned in each case to the respective at least one bearing and to the respective at least one seal at least one individual fixing for their independent connection to the housing.

14 Claims, 6 Drawing Sheets

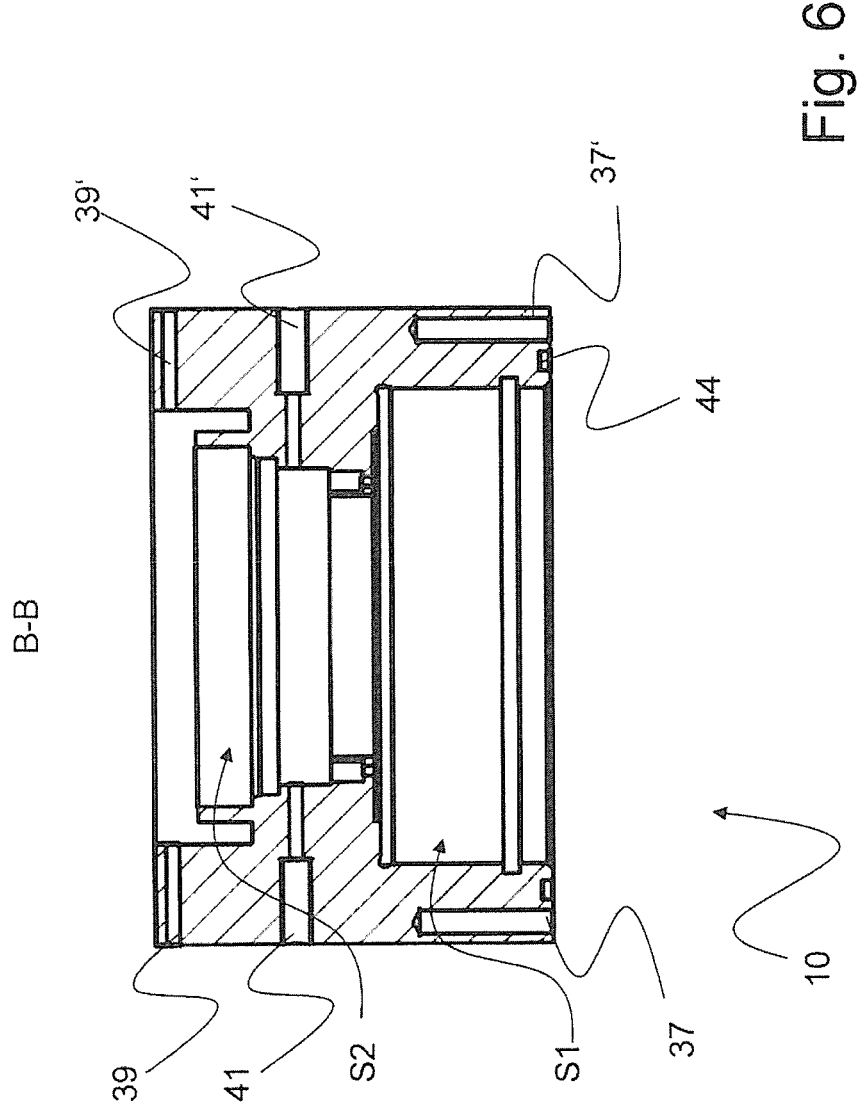

SEALING AND BEARING UNIT FOR AT LEAST TWO SHAFTS ORIENTATED IN PARALLEL WITH ONE ANOTHER AND METHOD FOR SEPARATING A SEALING AND BEARING UNIT FROM AT LEAST TWO SHAFTS ORIENTATED IN PARALLEL WITH ONE ANOTHER

FIELD OF THE INVENTION

The invention relates to a sealing and bearing unit for at least two shafts orientated in parallel with one another and a method for separating a sealing and bearing unit from at least two shafts orientated in parallel with one another.

BACKGROUND OF THE INVENTION

Shafts orientated in parallel with one another are known from the prior art, for example for size reduction units, wherein rotating cutting blades are carried by each of the shafts, said cutting blades engaging with one another for the size reduction of the given material. Such size reduction units can be used for example for waste materials in order to reduce the particle size by means of suitable cutting and/or impact and/or shearing processes. In various embodiments, the given waste materials are mixed with a liquid before size reduction. Since the shafts orientated in parallel with one another have to be suitably arranged on bearings, devices are desirable in practice with which contamination or contact of the given waste material with the bearing for the two shafts can at least for the most part be avoided.

For this purpose, bearing units are known from the prior art, which in addition provide a sealing function with respect to the waste materials to be sized-reduced in each case. Such a device is disclosed for example by DE 694 22 660 T2. The DE specification describes a size reduction unit with two shafts orientated in parallel with one another. The two shafts orientated in parallel with one another are fixed in a sealing device, which comprises a bearing structure and a slip-ring seal for each of the shafts. The bearing structure and the slip-ring seal assigned to the same shaft are jointly combined in a sealing arrangement. If wear occurs on the slip-ring seal or on the bearing, the whole sealing arrangement has to be removed. Since experience has shown that the latter has a great mass, removal by a person is impossible to carry out in practice or can only be done with difficulty. Furthermore, in the case of smaller replacement procedures of components, the whole sealing arrangement with the bearing structure and the slip-ring seal has to be removed and dismantled, and this is often accompanied by complexity with high time consumption during maintenance and repair.

The problem of the invention, therefore, is to make available a sealing and bearing unit for at least two shafts orientated in parallel with one another, wherein maintenance and/or repair of sealing and/or bearing components can take place in a simplified manner. In addition, it is intended to make available a method with which maintenance and/or repair of the sealing and/or bearing components is simplified. Furthermore, the sealing and bearing unit is to have a simple and uncomplicated structure.

SUMMARY OF THE INVENTION

The above problem is solved by a sealing and bearing unit and by a method which comprise the features in claims 1 and 12. Further advantageous embodiments are described by the sub-claims.

The sealing and bearing unit is provided for the accommodation of at least two shafts orientated in parallel with one another. In principle, various embodiments of the present invention can be used for any constructions which require a sealing bearing for two or more parallel shafts. In practice, the sealing and bearing unit according to the invention could be used in particular for devices in which the first shaft and the second shaft each comprise or carry cutting elements driven in a rotary manner, said cutting elements engaging with one another at least in part for the purpose of the size reduction of materials. The at least two shafts orientated in parallel with one another can thus be constituted as a component of a device for the size reduction of solid materials. The cutting elements can be constituted for example by cutting blades, which engage with one another in a rotary manner and reduce the size of the given solid material by means of a mutual engagement when the at least two shafts orientated in parallel with one another are driven.

With such devices known from the prior art for the size reduction of solid materials, a replacement of the given cutting elements is required at certain intervals. The structure of the sealing and bearing unit according to the invention also offers the advantage of its straightforward and uncomplicated removal in a few steps, after which a replacement of the given cutting elements can take place. Subsequently, the sealing and bearing unit can also be arranged on the at least two shafts orientated in parallel with one another in very few steps in the reverse order.

Furthermore, a sealing and bearing unit according to the invention can be connected to the shafts at free ends of the at least two shafts orientated in parallel with one another, wherein a further sealing and bearing unit according to the invention is connected in a sealing and bearing manner to the opposite ends which, as the case may be, are coupled with a gear unit. By means of two sealing and bearing units according to the invention, therefore, the at least two shafts orientated in parallel with one another can as a whole be arranged on bearings in a sealing manner. A closure element, described below in greater detail, can be provided for the sealing and bearing unit of the free ends of the shafts pointing away from the gear unit, whilst the sealing and bearing unit of the opposite ends has no such closure element.

It is conceivable, for example, that the two or more shafts orientated in parallel with one another are possibly connected to a motor via one or more step-up or step-down transmission stages. It is known to the addressed person skilled in the art how to constitute suitable gear stages in case of need, so that the numerous possibilities will not be dealt with within the scope of the present invention.

The sealing and bearing unit according to the invention comprises a housing, which is constituted in one piece in preferred embodiments of the present invention. A one-piece embodiment also offers the advantage of an uncomplicated production process. The bearings (described in greater detail below) for a first and a second of the shafts and also the sealing means (described in greater detail below) for the first and the second shaft can also be accommodated by means of a one-piece accommodation housing. Further components for carrying the bearings and/or sealing means, such as for example cartridges known from the prior art, can be dispensed with in the case of a one-piece embodiment of the housing and direct accommodation of the bearings and the sealing means by the housing.

The housing is expediently constituted in such a way that the at least two shafts orientated in parallel with one another, for the purpose of their bearing, project at least in sections into the housing or pass through the housing. Furthermore, the sealing and bearing unit can provide an accommodation for the at least two shafts orientated in parallel with one another, wherein the at least two shafts orientated in parallel with one another do not pass out of the housing, i.e. wherein the housing is constituted closed on one of its end faces pointing away from the two shafts, so that free ends of the at least two shafts orientated in parallel with one another are disposed in the housing inaccessible from the exterior when the housing is closed.

Furthermore, the housing comprises at least two openings for the at least two shafts orientated in parallel with one another. Each of the at least two shafts orientated in parallel with one another thus has its own opening in the housing assigned to it.

In addition, provision is made such that at least one bearing for the rotational holding of the respective shaft in the housing and at least one sealing means interposed between the housing and the respective shaft are assigned to each of the openings. The bearings and sealing means are constituted as separate components. The at least two shafts orientated in parallel with one another can expediently be supported on the bearings, so that the at least two shafts orientated in parallel with one another are carried at least in part by the bearings. The bearings can preferably be constituted as ring bearings, which are in contact over their surface area with the respective shaft. In particular, the bearings can be constituted as ball bearings.

In particularly preferred embodiments, the housing provides a seat for the respective bearings of the openings, wherein the respective bearings are held by means of a press fit or force fit in the respective seat of the respective opening. By means of the press fit or the constituted force fit, the housing itself can provide a fixing for the bearings in the housing. In straightforward conceivable embodiments, therefore, there is no need for further fixing means for connecting the bearings to the housing. In order to be able to hold the at least two shafts in the housing also in the presence of high axial loading, further fixing means, which will be dealt with in greater detail below, are however provided for connecting the bearings to the housing in preferred embodiments of the present invention.

Within the scope of the present invention, there is provided for the respective at least one bearing and the respective at least one sealing means at least one individual fixing in each case for their independent connection to the housing. A removal of the respective bearing can thus take place independently of a removal of the respective sealing means from the housing and after release of the respective fixing. Maintenance or repair of individual components is thus enabled in a straightforward and uncomplicated manner on account of the possibility of independent removal of bearings and sealing means after release of the respective fixings. Components that are not to be maintained or not to be repaired can remain at least partially in the housing.

Provision can also be made such that the fixings for connecting the respective bearing to the housing comprise at least one retaining ring in each case. By means of the respective retaining ring, an axial load transferred by the respective shaft to the respective bearing can also be borne. As already mentioned above, insofar as the bearings are accommodated in the housing by means of a press fit or force fit, a retaining ring can also be assigned in each case to the bearings for further fixing. It is also conceivable that the fixing of the bearings in the housing is provided solely by a retaining ring assigned in each case. The bearings can be supported here on the respective retaining ring. The respective retaining ring or rings can be inserted into a groove of the housing. In particular, embodiments have been tried and tested in practice in which the inserted retaining ring has a certain clearance with respect to the groove, so that easy insertion and simple removal, for example by means of tongs or suchlike, of the retaining ring or rings into and out of the respective groove can take place.

Provision can also be made such that, by means of the at least one retaining ring, axial fixing is also provided for the respective shaft, wherein the at least one retaining ring engages in a form-fit manner into the respective shaft. For example, the at least two shafts orientated in parallel with one another can each constitute a groove over their circumference, into which groove the respective retaining ring projects for the axial fixing of the respective shaft. A certain amount of clearance can also be constituted between the groove of the respective shaft and the retaining ring. By means of the retaining ring, therefore, a setpoint position can be selected for the respective shaft in the axial direction, in which the at least two shafts orientated in parallel with one another are held in the housing.

In the case of embodiments which provide an axial fixing for the respective shaft by means of at least one retaining ring, an axial movement of the respective shaft is advantageously prevented in both directions. The at least two shafts orientated in parallel with one another are thus held on the housing by means of the retaining ring. It has been shown in practice that the fixing of the at least two shafts orientated in parallel with one another by means of the respective retaining ring is sufficient to be able to eliminate an unintentional release or withdrawal of the sealing and bearing unit from the at least two shafts orientated in parallel with one another.

It is also conceivable that, after removal of a closure element removable at the end face of the housing and preferably constituted as a cover, axial fixings or retaining rings for the at least two shafts orientated in parallel with one another are accessible in the housing. If the closure element or the cover is connected to the housing, the axial fixings of the at least two shafts orientated in parallel with one another can be disposed in the housing inaccessible from the exterior. The risk of an unintentional release of the axial fixings with the resultant release of the sealing and bearing unit from the at least two shafts orientated in parallel with one another can thus be eliminated. In order to create a sealing arrangement between the closure element or cover and the housing, one or more sealing means preferably constituted ring-shaped, or O-rings, can be interposed between the housing and the closure element. It is conceivable here for the housing and/or the closure element to constitute a groove, in which the respective sealing means is disposed in clamping surface contact with the housing and the sealing element.

The connection of the housing to a removable closure element or cover as provided for in preferred embodiments also offers the advantage that an end-face entry of contaminants into the housing and contact of contaminants with the bearings can be excluded at least in large measure.

Since, in preferred embodiments, axial fixings or retaining rings for the shafts are accessible in the housing, it is possible, after removal of the closure element and release of the axial fixings or retaining rings, to remove the sealing and bearing unit directly from the at least two shafts orientated in parallel with one another, whilst the bearings and the sealing means continue to remain in the housing. In particular, provision can be made here such that only the one retaining ring is released in each case for the removal of the sealing and bearing unit from the at least two shafts orientated in parallel with one another. Further axial fixings for shafts to the housing are not provided in tried and tested embodiments.

As already mentioned above, the two shafts orientated in parallel with one another can each carry cutting elements, which engage with one another for the size reduction of solid materials. If a replacement or maintenance of the cutting elements is to take place, release of the sealing and bearing unit from the at least two shafts orientated in parallel with one another with subsequent replacement of the cutting elements can take place in a few steps in this embodiment. The bearings and the sealing means can continue to remain in the housing on account of their connections to the housing, so that renewed fixing to the at least two shafts orientated in parallel with one another after replacement of the cutting elements can take place in a straightforward and uncomplicated manner.

Since, in preferred embodiments, the retaining rings also constitute a fixing for connecting the bearings to the housing, a release of the bearings from the housing can take place after the release of the retaining rings and, if need be, after removal of the sealing and bearing unit from the at least two shafts orientated in parallel with one another. Since the sealing means are held in the housing by means of their own individual fixings, the sealing means can continue to remain connected to the housing after release of the bearings from the housing. The sealing means can then be removed from the housing by releasing the individual fixings of the sealing means.

If, after replacement of the corresponding cutting elements, the at least two shafts orientated in parallel with one another are to be connected again with the sealing and bearing unit, the at least two shafts orientated in parallel with one another are connected to the housing by means of their axial fixings or retaining rings after introduction of the two shafts orientated in parallel with one another or after the sealing and bearing unit has been positioned on the at least two shafts orientated in parallel with one another. Furthermore, in order to prevent unintentional release of the axial fixings or retaining rings and to avoid entry of contaminants into the housing, the closure element or the cover can then be fitted on the housing. The renewed connection of the at least two shafts orientated in parallel with one another to the sealing and bearing unit is also possible in a few steps here.

Furthermore, the closure element can be held to the housing by means of one or more connections, in particular screw connections, which connections engage in corresponding locating bores of the housing and terminate essentially flush with the closure element. Since bores suitable for the connections or the screw connections have to be constituted in the closure element and in the housing, penetration of contaminants into the bores can be excluded by means of a flush termination of the screw connections. If screw connections are provided, the locating bores can comprise threaded sections, which correspond with corresponding counter-threaded sections of the screw connections. The connection between the closure element or cover and the housing is not restricted here to screw connections, so that, in addition or alternatively, other connections such as for example latching and/or snap-in and/or clamping connections can be used in the numerous other embodiments of the present invention.

Provision can also be made such that the at least one sealing means interposed between the housing and the respective shaft comprises a non-rotating part and a part rotating together with the respective shaft, said part rotating together with the shaft being brought into contact over its surface area with the respective shaft. The sealing means of the respective opening can thus be constituted as a slip-ring seal. A sealing element, such as an O-ring or suchlike, can preferably be interposed between the non-rotating part and the housing. In addition, the at least two shafts orientated in parallel with one another can be supported directly on the part of the respective sealing means that rotates together with the respective shaft. Furthermore, at least one sealing element, such as an O-ring or suchlike, can be interposed in each case between the respective non-rotating part and the part rotating together with the respective shaft. The non-rotating part, in an operative connection with the part rotating together with the respective shaft, and one or more sealing elements can constitute a labyrinth seal.

In preferred embodiments, the part rotating together with the respective shaft can constitute an accommodation for the non-rotating part, in which accommodation the respective non-rotating part is accommodated at least in sections and preferably in a form-fit manner.

If an axial fixing, such as for example a retaining ring, is provided and constituted for the at least two shafts orientated in parallel with one another, the sealing means, if appropriate comprising a non-rotating part and a part rotating together with the respective shaft, can be held in a form-fit manner in the housing by means of the shaft and the housing.

Provision can also be made such that the sealing means, comprising a non-rotating part and a part rotating together with the respective shaft, is brought into an operative connection with a spring mechanism, in such a way that the non-rotating part and the part rotating together with the shaft can be moved towards one another in a force-actuated manner by means of the spring mechanism for the sealing connection. The spring mechanism can be supported here on the housing of the bearing and sealing unit and, if need be, can be disposed in a seat of the housing. It is also conceivable that the respective spring mechanism is guided, at least in sections or completely, radially around a longitudinal axis of the respective drive shaft.

Provision can preferably be made such that a sealing element preferably constituted ring-shaped is interposed, with clamping surface contact, between the non-rotating part and the part of the sealing means rotating together with the respective shaft. The sealing element can preferably be constituted as an O-ring. The clamping surface contact can be produced here by means of the spring mechanism, wherein the non-rotating part is moved by means of the spring mechanism towards the part rotating together with the respective shaft with interposed sealing means. The movement can expediently take place in such a way that the spring mechanism guides, in a force-actuated manner, the non-rotating part parallel to the longitudinal axis of the respective shaft in the direction of the part rotating together with the respective shaft.

In order to seal the respective shaft with respect to the sealing means or with respect to the respective part rotating together with the shaft, provision can also be made such that a sealing element preferably constituted ring-shaped is interposed, with clamping surface contact, between the respective shaft and the respective part rotating together with the shaft. This sealing element can also preferably be constituted here as an O-ring. For the addressed person skilled in the art, it is clear that, in various embodiments, more than one sealing element can also be used for the fluidic sealing of the shaft with respect to the part rotating together with the shaft.

Provision can also be made such that the at least one fixing of the respective sealing means comprises at least one blocking element, by means of which the respective sealing means can be fixed to the housing in an axially immobile manner, preferably by means of a form-fit engagement of the at least one blocking element. The at least one blocking element can for example comprise one or more first bolt connections, which engage in a form-fit manner in the part rotating together with the respective shaft and fix the respective part rotating together with the respective shaft to the housing in an axially immobile manner. The at least one blocking element or the one or more first bolt connections can be accommodated in the housing orientated normal to the longitudinal axis of the at least two parallel shafts.

It is also conceivable that the at least one blocking element comprises one or more second bolt connections, which fix the non-rotating part of the sealing means in a clamping manner to the housing. The second bolt connections can be orientated in parallel to the first bolt connections. If the respective sealing means, as already mentioned previously, is brought into an operative connection with a spring mechanism, provision can be made such that the operative connection can be removed by means of the one or more second bolt connections. When the operative connection is removed, the spring mechanism can be brought, in a force-actuated manner, into contact with the one or more second bolt connections, wherein a force-actuated contact of the spring mechanism on the respective sealing means is removed. Especially when the respective sealing means is to be inserted into the housing, a force-actuated contact of the spring mechanism with the sealing means can be prevented during the insertion by means of the one or more second bolt connections.

Moreover, the invention relates to a method for separating a sealing and bearing unit from at least two shafts orientated in parallel with one another. Within the scope of a first method step, individual fixings are produced or maintained between the sealing means and the housing and between the bearings and the housing.

Furthermore, a closure element held detachably at the end face end of the housing and preferably constituted as a cover is removed, resulting from which axial fixings of the at least two shafts orientated in parallel with one another to the housing are accessible.

Once the closure element or the cover has been released, the axial fixings of the at least two shafts orientated in parallel with one another can then be released. Removal of the sealing and bearing unit from the at least two shafts orientated in parallel with one another then takes place, wherein the sealing means and the bearings continue to be held in the housing by their fixings.

Since, in the method according to the invention, the sealing means and the bearings can continue to remain in the housing during and after removal of the sealing and bearing unit, removal of the sealing and bearing unit, possibly for the replacement of one or more cutting elements disposed on the shafts orientated in parallel with one another, is possible in a few straightforward and easily implementable method steps.

In preferred embodiments, provision can also be made such that bearings accommodated in the housing by means of a press fit are removed from the housing independently of the sealing means. The removal preferably takes place here after removal of the sealing and bearing unit from the at least two shafts orientated in parallel with one another.

Provision can also be made such that, for maintenance and/or repair when required, the sealing means are removed from the housing independently of the bearings after removal of the sealing and bearing unit and after release of the individual fixing between the housing and the sealing means. The bearings can thus remain in the housing during the removal of the sealing and bearing unit. As explained above, the individual connections of the sealing means can each comprise at least one blocking element, by means of which the respective sealing means is fixed axially immobile to the housing. In order to be able to remove the sealing means from the housing, prior release of the connection between the least one blocking element and the respective bearing may be necessary.

Examples of embodiment of the invention and its advantages are explained in greater detail below with the aid of the appended figures. The size ratios of the individual elements with respect to one another in the figures do not always correspond to the actual size ratios, since some forms are represented simplified and other forms magnified compared with other elements for the sake of better clarity.

BRIEF DESCRIPTION OF THE DRAWINGS

FIG. 6 shows a cross-section through an embodiment of a housing for a sealing and bearing unit along a line of intersection B-B from FIG. 4.

DETAILED DESCRIPTION OF THE INVENTION

Identical reference numbers are used for identical or identically acting elements of the invention. Furthermore, for the sake of clarity, only reference numbers that are required for the description of the given figure are represented in the individual figures. The represented embodiments only represent examples as to how the sealing and bearing unit according to the invention or the method according to the invention can be constituted and do not represent a conclusive limitation.

Figure 1:
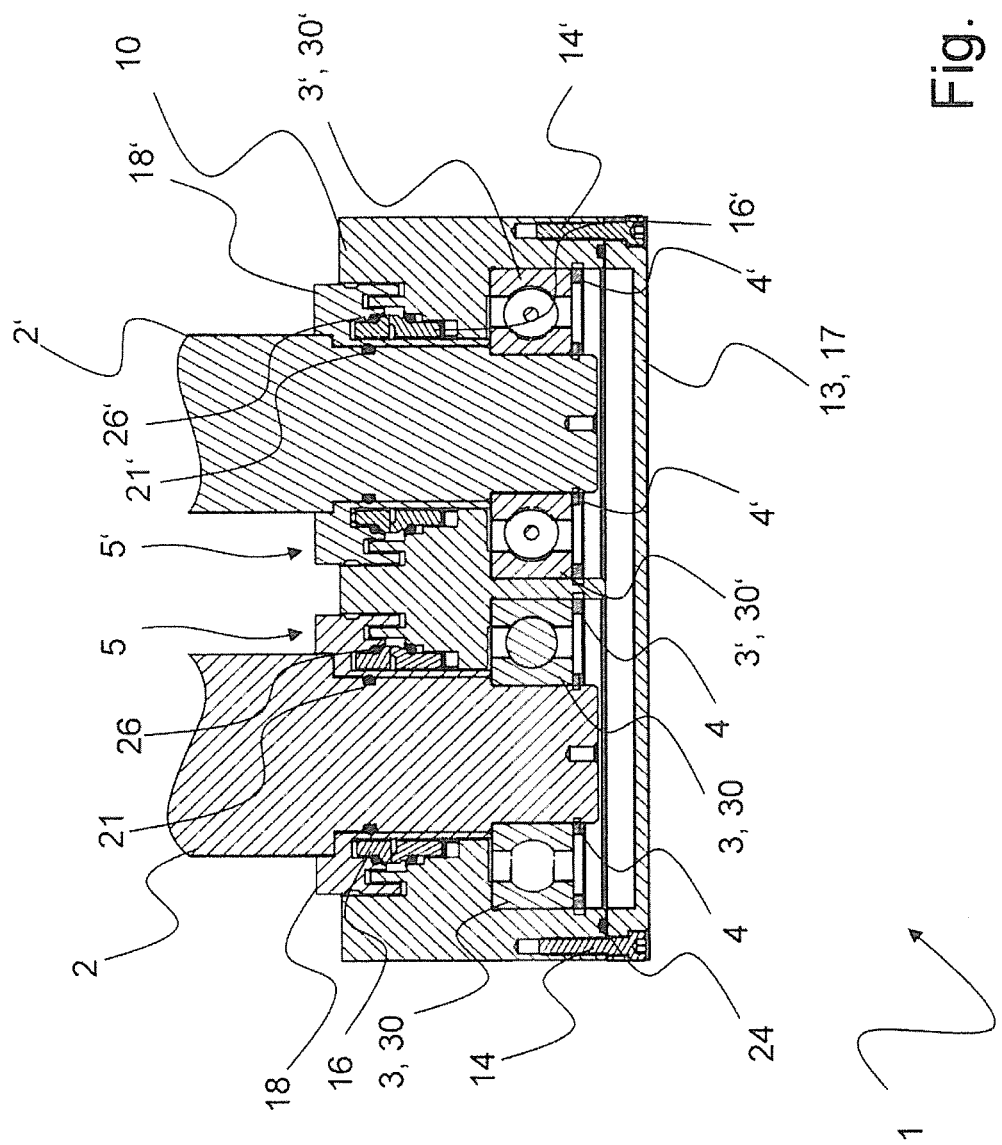
FIG. 1 shows a diagrammatic cross-section through a possible embodiment of a sealing and bearing unit according to the invention.

FIG. 1 shows a diagrammatic cross-section through a possible embodiment of a sealing and bearing unit 1 according to the invention. Sealing and bearing unit 1 is provided to accommodate the two shafts 2 and 2' orientated in parallel with one another, which in the present case are constituted as a component of a size reduction unit, which is not shown in FIG. 1. Shafts 2 and 2' carry cutting elements which rotate together with shafts 2 and 2' and engage with one another for the size reduction of solid materials.

A further sealing and bearing unit 1 (not represented) is disposed in the region of a gear unit at the other ends of the two shafts 2 and 2'. Sealing and bearing unit 1 in the region of the gear unit does not comprise a closure element 13 described in greater detail below. The further structural components of sealing and bearing unit 1 in the region of the gear unit are in accordance with the representation shown in FIG. 1.

Sealing and bearing unit 1 comprises a housing 10 constituted in one piece with an opening 15 and 15' (see FIG. 3) for in each case one of the two shafts 2 and 2' orientated in parallel with one another. Housing 10 is closed by means of a closure element 13 or a cover 17 on its end face pointing away from the two shafts 2 and 2'. Shafts 2 and 2' thus project into housing 10, wherein their free ends are arranged on bearings in housing 10 inaccessible from the exterior when closure element 13 is in place on housing 10. Contact with the free ends of shafts 2 and 2' can thus be eliminated when closure element 13 is in place or when cover 17 is in place on housing 10.

Closure element 13 is held to housing 10 by means of screw connections 14 and 14'. Screw connections 14 and 14' each terminate flush with cover 17, so that no contaminants can enter into bores of cover 17.

As can also be seen from FIG. 1, an O-Ring 24 is interposed between closure element 13 and housing 10 for their sealed connection, said O-Ring being inserted into a groove of housing 10.

Assigned to each of openings 15 and 15' is a bearing 3 and respectively 3', in the present case each constituted as ball bearings 30 and respectively 30'. Respective shaft 2 and 2' is brought into contact over its entire circumference with respective bearing 3 and 3' and is held in a supported manner by respective bearing 3 and 3'. Housing 10 also provides a first seat S1 and S1' (see FIGS. 5 and 6) for accommodating bearings 3 and 3', in which first seat S1 and S1' bearings 3 and 3' are accommodated by means of a press fit.

In addition to the connection of bearings 3 and 3' by means of a press fit to housing 10, retaining rings 4 and 4' are provided, which fix bearings 3 and 3' in a supporting manner on housing 10. By means of retaining rings 4 and 4', an axial fixing is also provided for respective shaft 2 and 2', wherein retaining rings 4 and 4' engage in a groove of respective shaft 2 and 2'. Respective shaft 2 and 2' can thus be advantageously held in housing 10 axially immobile in both directions by means of respective retaining ring 4 and 4'.

If retaining rings 4 and 4', i.e. the axial fixing for shafts 2 and 2', are released, the connection of bearings 3 and 3' to housing 10 by means of a press fit suffices to hold bearings 3 and 3' in housing 10. By means of the axial fixing by means of retaining rings 4 and 4' and the corresponding groove of shafts 2 and 2', a position is thus fixed in which the two parallel shafts 2 and 2' are held in housing 10.

When closure element 13 or cover 17 is in place on housing 10, the axial fixings for shafts 2 and 2' constituted by retaining rings 4 and 4' are accommodated in housing 10 inaccessible from the exterior. The risk of an unintentional release of sealing and bearing unit 1 from shafts 2 and 2' by contact with retaining rings 4 and 4' can thus be excluded.

If sealing and bearing unit 1 is to be removed from the two shafts 2 and 2' orientated in parallel with one another, the axial fixings or retaining rings 4 and 4' have to be released following prior removal of closure element 13. Immediately after release of retaining rings 4 and 4', sealing and bearing unit 1 can then be withdrawn from shafts 2 and 2' parallel to the longitudinal extension of shafts 2 and 2'.

Housing 10 also comprises, for each opening 15 and 15', a groove into which retaining ring 4 and respectively 4' projects in a form-fit manner.

In order to guarantee a sealing bearing of shafts 2 and 2', a sealing means 5 and 5' is assigned respectively to each opening 15 and 15'. Sealing means 5 and 5' are each constituted as a slip-ring seal and are in surface contact with respective shaft 2 and 2'.

Each of sealing means 5 and 5' comprises a non-rotating part 16 and 16' and a part 18 and 18' rotating together with respective shaft 2 and 2'. Part 18 and 18' rotating together with respective shaft 2 and 2' is brought into contact over its surface area with respective shaft 2 and 2'. In order to seal shafts 2 and 2' fluidically with respect to part 18 and 18' rotating together with the shaft, an O-Ring 21 and 21' is interposed in a clamping manner in each case between respective shaft 2 and 2' and respective part 18 and 18' rotating together with the shaft.

As can also be seen in FIG. 1, shafts 2 and 2' are supported on parts 18 and 18' of sealing elements 5 and 5', said parts rotating with the shaft. Furthermore, respective non-rotating part 16 and 16' is accommodated at least in part in respective part 18 and 18' rotating together with the shaft. In order to seal non-rotating part 16 and 16' fluidically with respect to respective parts 18 and 18' rotating together with the shaft, O-rings 26 and 26' are interposed between non-rotating parts 16 and 16' and their associated parts 18 and 18' rotating together with the respective shaft.

Figure 2:
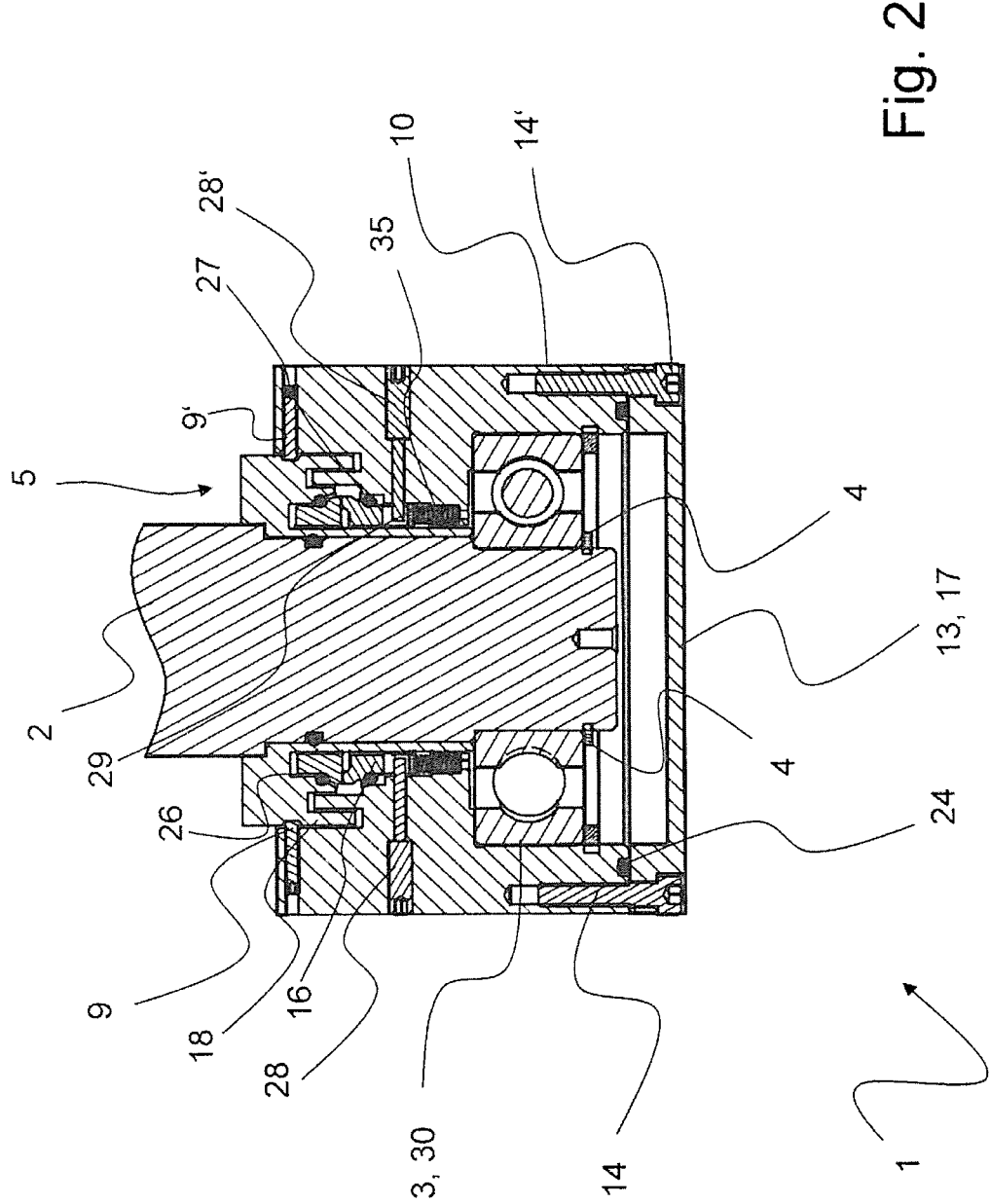
FIG. 2 shows a further diagrammatic cross-section through the embodiment of a sealing and bearing unit according to the invention from FIG. 1.

FIG. 2 shows a further diagrammatic cross-section through the embodiment of a sealing and bearing unit 1 according to the invention from FIG. 1. It is true that only the sealing bearing for shaft 2 of the two shafts 2 and 2' can be seen in the cross-section from FIG. 2. The structural design of the sealing bearing for the other shaft 2' is however constituted identically.

Represented in the cross-section of FIG. 2 are bolt connections 9 and 9', which fix sealing means 5 and 5' of respective opening 15 and 15' to housing 10 in an axially immobile manner. Bolt connections 9 and 9' engage for this purpose in a form-fit manner in part 18 rotating together with the shaft.

Spring mechanism 35 represented in the cross-section of FIG. 2 is brought into an operative connection with sealing means 5, in such a way that non-rotating part 16 is moved in a force-actuated manner towards part 18 rotating together with the shaft. Spring mechanism 35 is supported for this purpose on housing 10 and is connected with its end pointing in the direction of sealing means 5 to a supporting ring 29.

Since an O-ring 26 is interposed between non-rotating part 16 and part 18 rotating together with the shaft, a sealing connection of non-rotating part 16 with respect to part 18 rotating together with the shaft can be created by means of the force-actuated movement of non-rotating part 16 in the direction of part 18 rotating together with the shaft. A further O-ring 27 is interposed in a clamping manner between non-rotating part 16 and housing 10.

In the representation from FIG. 2, spring mechanism 35 is blocked by bolt connections 28 and 28', so that no movement of non-rotating part 16 in the direction of part 18 rotating together with the shaft takes place via spring mechanism 35. For example, bolt connections 28 and 28' can block spring mechanism 35 when sealing means 5 is to be inserted into housing 10. Once sealing means 5 has been inserted into housing 10 and bolt connections 9 and 9' engage in part 18 rotating together with the shaft for the purpose of the axial fixing, the blocking of spring mechanism 35 by bolt connections 28 and 28' can be removed, so that as a result of this non-rotating part 16 is moved in a force-actuated manner in the direction of part 18 rotating together with the shaft. A sealing connection is created here by means of non-rotating part 16, part 18 rotating together with the shaft and interposed O-ring 26.

If a replacement and/or maintenance of individual components of sealing and bearing unit 1 is to be carried out, screw connections 14 and 14' are released in a first step, said screw connections fixing closure element 13 or cover 17 to housing 10. Removal of closure element 13 or cover 17 can then take place.

After removal of closure element 13 or cover 17, retaining rings 4 and 4', which provide an axial fixing for respective shaft 2 and 2' and an individual connection of bearings 3 and 3' to housing 10, are then accessible.

Bolt connections 9 and 9' are not released or inserted and continue to engage in part 18 of sealing means 5 rotating together with the shaft, so that sealing means 5 is held to housing 10 in an axially immobile manner.

Once closure element 13 or cover 17 is released, retaining rings 4 and 4', which constitute the axial fixing for shafts 2 and 2', are released. As already mentioned above, retaining rings 4 and 4' also carry bearings 3 and 3'. However, since bearings 3 and 3' also comprise a further individual connection to housing 10, said further individual connection being constituted by a press fit, bearings 3 and 3' are held to housing 10 also after removal of retaining rings 4 and 4'.

Once retaining rings 4 and 4' have been released, sealing and bearing unit 1 can be withdrawn from shafts 2 and 2' in the axial direction without the release of further fixings. Sealing means 5 and 5' continue to be connected via bolt connections 9 and 9' to housing 10 and bearing 3 and 3' continue to be connected thereto by their press fit.

A replacement of cutting elements on one or both shafts 2 and 2' can then take place, wherein, after a replacement of the respective cutting elements, sealing and bearing unit 1 can be reconnected with shafts 2 and 2' in a straightforward and uncomplicated manner by the placing-on and fitting of retaining rings 4 and 4'.

If need be, maintenance and/or replacement of sealing means 5 and 5' can also take place after removal of sealing and bearing unit 1. An engagement of bolt connections 9 and 9' and respective part 18 and 18' rotating together with the shaft is previously released for this purpose, so that respective sealing means 5 and 5' can be removed from housing 10.

After removal, insofar as maintenance and/or a replacement of one or more of bearings 3 and 3' is required, a removal of respective bearing or bearings 3 and 3' can also take place by overcoming the press fit. Removal of bearings 3 and 3' can thus be carried out independently of a removal of sealing means 5 and 5'.

Figure 3:
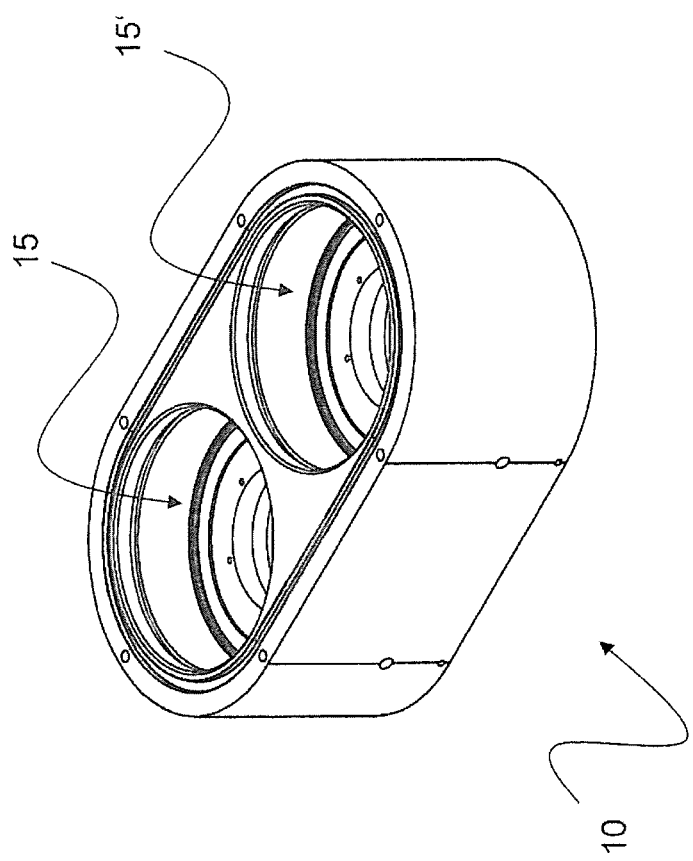
FIG. 3 shows a diagrammatic perspective view of a housing, such as can be used in various embodiments of a sealing and bearing unit according to the invention.

FIG. 3 shows a diagrammatic perspective view of a housing 10, such as can be used in various embodiments of a sealing and bearing unit 1 according to the invention. Housing 10 comprises two adjacent openings 15 and 15', into which openings 15 and 15' one of the two shafts 2 and 2' projects in each case. Sealing means 5 and 5' represented in FIGS. 1 and 2 and bearings 3 and 3' represented in FIGS. 1 and 2 are also accommodated in openings 15 and 15'.

If sealing and bearing unit 1 is constituted according to the examples of embodiment from FIGS. 1 and 2 and with a housing 10 as represented in FIG. 3, bearings 3 and 3' are inserted by means of a press fit into housing 10 in a first step. Spring mechanism 35 is then fitted in housing 10 and is blocked there by means of bolt connections 28 and 28', as shown in FIG. 2. In a following step, sealing means 5, comprising non-rotating part 16 and 16', a part 18 and 18' rotating together with the shaft and interposed O-ring 26 and 26', can be inserted into housing 10 and fixed by means of bolt connections 9 and 9'.

The constituted unit comprising housing 10, bearings 3 and 3' as well as sealing means 5 and 5' can now be placed onto the two shafts 2 and 2' orientated in parallel. A connection of the two shafts 2 and 2' orientated in parallel then takes place to housing 10 by means of retaining rings 4 and 4'. In order to keep shafts 2 and 2' and retaining rings 4 and 4' inaccessible and to prevent entry of contaminants into housing 10, closure element 13 or cover 17 is then fixed on housing 10 with interposed O-ring 24.

Figure 4:
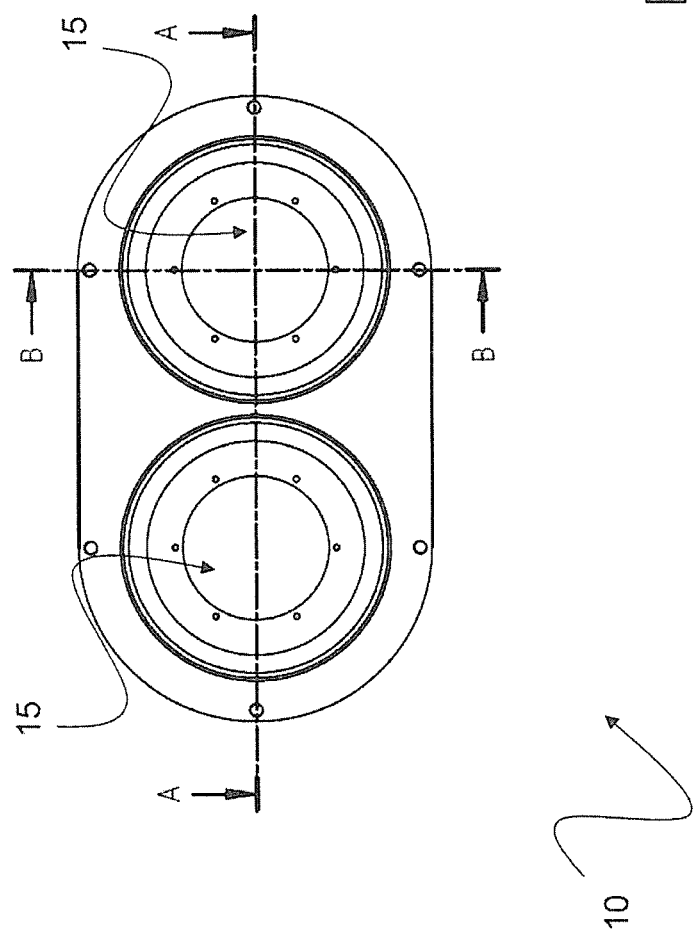
FIG. 4 shows a diagrammatic plan view of the embodiment of the housing from FIG. 3.

FIG. 4 shows a diagrammatic plan view of the embodiment of housing 10 from FIG. 3. Again represented in FIG. 4 are openings 15 and 15' for the two shafts 2 and 2' orientated in parallel with one another. The one-piece embodiment of housing 10 can also be clearly seen in FIG. 4.

Figure 5:
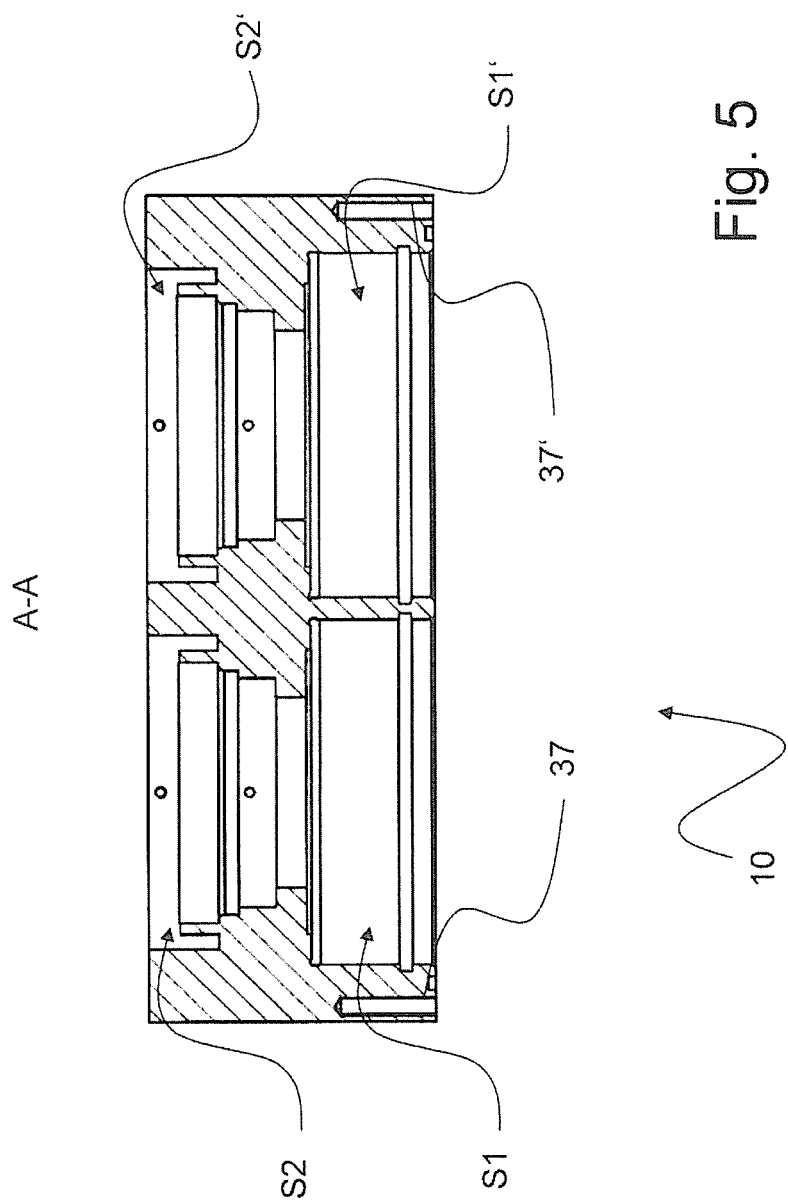
FIG. 5 shows a cross-section through an embodiment of a housing for a sealing and bearing unit along a line of intersection A-A from FIG. 4.

FIG. 5 shows a cross-section through an embodiment of a housing 10 for a sealing and bearing unit 1 along a line of intersection A-A from FIG. 4. Housing 10 constitutes two first seats S1 and S1' for bearings 3 and 3'. Bearings 3 and 3' can be accommodated in seats S1 and S1' by means of a press fit.

Also represented in the cross-section of FIG. 5 are two seats S2 and S2' for sealing means 5 and 5'. Sealing means 5 and 5' can be inserted into seats S2 and S2' when bearing and sealing unit 1 is assembled.

Bores 37 and 37' are already introduced into housing 10 during the production process of one-piece housing 10, said bores being constituted to receive screw connections 14 and 14' for the purpose of fixing closure element 13 (see FIGS. 1 and 2) to housing 10.

FIG. 6 shows a cross-section through an embodiment of housing 10 for a sealing and bearing unit 1 along a line of intersection B-B from FIG. 4. First seat S1 already represented in FIG. 5 and second seat S2 already represented in FIG. 5 can also be seen in FIG. 6. Also shown are bores 37, 37' which serve to receive screw connections 14 and 14'.

FIG. 6 also shows further bores 39, 39' as well as 41 and 41'. Bores 39 and 39' are provided for receiving bolt connections 9 and 9', which are constituted for the purpose of axial fixing of sealing means 5 and 5'. Bores 41 and 41' are provided for receiving bolt connections 28 and 28', which are constituted for the purpose of blocking spring mechanism 35.

The invention has been described by reference to a preferred embodiment. A person skilled in the art can however imagine that modifications or changes to the invention can be made without thereby departing from the scope of protection of the following claims.

What is claimed is:

1. A sealing and bearing unit for at least two shafts orientated parallel with one another, comprising:
    a housing constituted in one piece with at least two openings for the at least two shafts orientated in parallel with one another;
    wherein there are assigned to each opening: (i) at least one bearing configured to rotationally hold the respective shaft in the housing, and (ii) at least one seal interposed between the housing and the respective shaft; and
    wherein there is assigned in each case to the respective at least one bearing and to the respective at least one seal at least one individual fixing for their independent connection to the housing.

2. The sealing and bearing unit according to claim 1, wherein the fixings for the connection of the respective bearing to the housing comprise at least one retaining ring in each case.

3. The sealing and bearing unit according to claim 2, wherein the at least one retaining ring provides an axial fixing for the respective shaft, wherein the at least one retaining ring engages in each case in a form-fit manner into the respective shaft.

4. The sealing and bearing unit according to claim 1, wherein the respective at least one bearing is held in the housing by at least one of a force fit and a press fit.

5. The sealing and bearing unit according to claim 1, wherein, after removal of a closure element removable at an end face of the housing and constituted as a cover, axial fixings for the shafts are accessible in the housing.

6. The sealing and bearing unit according to claim 5, wherein the closure element is held to the housing by one or more screw connections that engage in corresponding locating bores of the housing and terminate essentially flush with the closure element.

7. The sealing and bearing unit according to claim 1, wherein the at least one seal interposed between the housing and the respective shaft comprises a non-rotating part and a part rotating together with the respective shaft, said part rotating together with the shaft configured to be brought into contact over its surface area with the respective shaft.

8. The sealing and bearing unit according to claim 7, wherein the seal comprising a non-rotating part and a part rotating together with the respective shaft is brought into an operative connection with a spring, in such a way that the non-rotating part and the part rotating together with the shaft are movable towards one another in a force-actuated manner by the spring.

9. The sealing and bearing unit according to claim 7, wherein a ring-shaped sealing element is interposed, with clamping surface contact, between the non-rotating part and the part rotating together with the respective shaft.

10. The sealing and bearing unit according to claim 7, wherein a ring-shaped sealing element is interposed, with clamping surface contact, between the respective shaft and the respective part rotating together with the shaft.

11. The sealing and bearing unit according claim 1, wherein the at least one fixing of the respective seals comprises at least one blocking element, by which the respective at least one seal is fixable to the housing in an axially immobile manner, by a form-fit engagement of the at least one blocking element.

12. A method for separating a sealing and bearing unit for at least two shafts orientated in parallel with one another, the sealing and bearing unit including:

a housing constituted in one piece with at least two openings for the at least two shafts orientated in parallel with one another;

wherein there are assigned to each opening: (i) at least one bearing configured to rotationally hold the respective shaft in the housing, and (ii) at least one seal interposed between the housing and the respective shaft; and wherein there is assigned in each case to the respective at least one bearing and to the respective at least one seal at least one individual fixing for their independent connection to the housing;

the method comprising the following steps:

at least one of producing and maintaining the individual fixings between the seals and the housing and between the bearings and the housing, removing a closure element held detachably at an end face end of the housing and constituted as a cover with resultant accessibility to axial fixings of the two shafts orientated in parallel with one another to the housing, releasing the axial fixings of the two shafts orientated in parallel with one another, removing the sealing and bearing unit from the at least two shafts orientated in parallel with one another, wherein the seal and the bearings continue to be held in the housing by their fixings.

13. The method according to claim 12, wherein, after removal of the sealing and bearing unit, bearings accommodated in the housing by a press fit are removed from the housing independently of the seal.

14. The method according to claim 12, wherein, after removal of the sealing and bearing unit and after release of the individual fixings between the housing and the seal, the seals are removed from the housing independently of the bearings.

\* \* \* \* \*